United States Patent
Yu et al.

(10) Patent No.: US 10,120,650 B2
(45) Date of Patent: Nov. 6, 2018

(54) METHOD AND APPARATUS FOR CALCULATING DATA

(71) Applicant: Samsung Electronics Co., Ltd., Suwon-si (KR)

(72) Inventors: Hyeongseok Yu, Seoul (KR); Yeongon Cho, Hwaseong-si (KR); Changmoo Kim, Seoul (KR); Soojung Ryu, Hwaseong-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 42 days.

(21) Appl. No.: 14/869,227

(22) Filed: Sep. 29, 2015

(65) Prior Publication Data
US 2016/0092171 A1    Mar. 31, 2016

(30) Foreign Application Priority Data

Sep. 30, 2014  (KR) .................. 10-2014-0132014
Jun. 26, 2015  (KR) .................. 10-2015-0091388

(51) Int. Cl.
| | | |
|---|---|---|
| *G06F 1/00* | (2006.01) | |
| *G06F 7/544* | (2006.01) | |
| *G06F 1/035* | (2006.01) | |
| *G06F 7/483* | (2006.01) | |

(52) U.S. Cl.
CPC .............. *G06F 7/544* (2013.01); *G06F 1/035* (2013.01); *G06F 7/483* (2013.01)

(58) Field of Classification Search
CPC ................................................. G06F 1/0307
See application file for complete search history.

(56) References Cited

U.S. PATENT DOCUMENTS

| | | |
|---|---|---|
| 5,260,898 A | 11/1993 | Richardson |
| 6,282,556 B1 | 8/2001 | Chehrazi et al. |
| 6,298,369 B1 | 10/2001 | Nguyen |
| 6,711,596 B1 * | 3/2004 | Coleman ................ G06F 7/556 |
| | | 708/277 |
| 7,366,745 B1 | 4/2008 | Oberman et al. |
| 8,285,768 B2 | 10/2012 | Fenney |
| 2003/0149712 A1 * | 8/2003 | Rogenmoser .......... G06F 7/535 |
| | | 708/495 |
| 2010/0318592 A1 | 12/2010 | Han et al. |

FOREIGN PATENT DOCUMENTS

| | | |
|---|---|---|
| JP | 2007-81832 A | 3/2007 |
| JP | 5563193 B2 | 6/2014 |

OTHER PUBLICATIONS

Extended European Search Report (EESR) dated Feb. 10, 2016 in counterpart European Application No. 15179706.5 (9 pages in English).

* cited by examiner

*Primary Examiner* — David H Malzahn
(74) *Attorney, Agent, or Firm* — Harness, Dickey & Pierce, P.L.C.

(57) ABSTRACT

A method of calculating data includes acquiring a difference between first data that is input and second data that was previously stored; determining a method of generating third data corresponding to a result of a calculation of the first data based on the difference; and performing a calculation corresponding to the determined method using a calculator.

26 Claims, 9 Drawing Sheets

METHOD AND APPARATUS FOR CALCULATING DATA

CROSS-REFERENCE TO RELATED APPLICATION(S)

This application claims the benefit of Korean Patent Application Nos. 10-2014-0132014 filed on Sep. 30, 2014, and 10-2015-0091388 filed on Jun. 26, 2015, in the Korean Intellectual Property Office, the entire disclosures of which are incorporated herein by reference for all purposes.

BACKGROUND

1. Field

This application relates to a method and apparatus for calculating data.

2. Description of Related Art

A central processing unit (CPU) or a graphics processing unit (GPU) may perform a calculation of data represented using a floating point method by substituting a number corresponding to the data into a mathematical function.

In this case, the CPU or the GPU may perform a calculation using a look-up table storing information needed for calculating all pieces of data that may be input. However, the look-up table needs to store many pieces of information in order to provide accurate calculation results, and thus an enormous storage space is required.

The CPU or the GPU may also perform a calculation by approximating a mathematical function by a polynomial. However, since a high-order polynomial is needed to obtain accurate calculation results, excessive switching between logic gates may occur during the calculation.

The CPU or the GPU may process a plurality of pieces of data at one time in response to a single command. In this case, the plurality of pieces of data to be processed may be integrated together. In other words, the pieces of data that are processed at one time may be localized within a predetermined section. Therefore, when the CPU or the GPU sequentially processes (i.e., calculates) pieces of data localized within a predetermined section, a method of reducing the amount of data stored in the look-up table and the number of times switching between logic gates occurs during a calculation is needed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of calculating data includes acquiring a difference between first data that is input and second data that was previously stored; determining a method of generating third data corresponding to a result of a calculation of the first data based on the difference; and performing a calculation corresponding to the determined method using a calculator.

The determining of the method may include comparing the difference with a threshold value, and determining the method of generating the third data based on a result of the comparing.

The performing of the calculation may include performing a calculation to generate the third data based on the first data in response to the difference exceeding the threshold value, and performing a calculation to generate the third data based on the difference and a result of a calculation of the second data in response to the difference being less than or equal to the threshold value.

The performing of the calculation may include generating the third data based on the difference or a coefficient determined based on the first data.

The determined coefficient may be selected from coefficients stored in correspondence to the difference or the first data.

The determined method may include a first method of performing a calculation based on an entirety of the first data, or a second method of adding a product of the difference and a coefficient determined based on the first data to a product of the second data and the coefficient.

The method may further include storing the difference and the first data.

The performing of the calculation may include performing the calculation using either all or only a part of a single calculator according to the determined method.

The single calculator may include a multi-precision calculator configured to perform a multiplication of N bits and a multiplication of N/2 bits.

The performing of the calculation may include selecting a calculator from different calculators according to the determined method, and performing the calculation using the selected calculator.

The first data and the second data may correspond to numbers represented using a floating point method.

In another general aspect, a non-transitory computer-readable storage medium stores instructions to cause computing hardware to perform the method described above.

In another general aspect, an apparatus for calculating data includes an acquisition unit configured to acquire a difference between first data that is input and second data that was previously stored; a determination unit configured to determine a method of generating third data corresponding to a result of a calculation of the first data based on the difference; and a calculation unit configured to perform a calculation corresponding to the determined method.

The determination unit may be further configured to compare the difference with a threshold value, and determine the method of generating the third data based on a result of the comparing.

The calculation unit may be further configured to perform a calculation to generate the third data based on the first data in response to the difference exceeding the threshold value, and perform a calculation to generate the third data based on the difference and a result of a calculation of the second data in response to the difference being less than or equal to the threshold value.

The calculation unit may be further configured to generate the third data based on the difference or a coefficient determined based on the first data.

The determined coefficient may be selected from coefficients stored in correspondence to the difference or the first data.

The determined method may include a first method of performing a calculation based on an entirety of the first data, or a second method of adding a product of the difference and a coefficient determined based on the first data to a product of the second data and the coefficient.

The apparatus may further include a storage unit configured to store the difference and the first data.

The calculation unit may include a single calculator, and may be further configured to perform the calculation using either all or only a part of the single calculator according to the determined method.

The single calculator may include a multi-precision calculator configured to perform a multiplication of N bits and a multiplication of N/2 bits.

The calculation unit may include different calculators; and the calculation unit may be further configured to select a calculator from the different calculators according to the determined method, and perform the calculation using the selected calculator.

The first data and the second data may correspond to numbers represented using a floating point method.

In another general aspect, an apparatus for calculating data includes an acquisition unit configured to acquire a difference between first data that is input and second data that was previously stored; a calculation unit including multiplier inputs; and a determination unit configured to determine a method of generating third data corresponding to a result of a calculation of the first data based on the difference, and control data input to the multiplier inputs to control the calculation unit to perform a calculation according to the determined method.

The determination unit may be further configured to compare the difference with a threshold value, and determine the method of generating the third data based on a result of the comparing.

The calculation unit may be further configured to perform a multiplication of N bits and a multiplication of N/2 bits; and the determination unit may be further configured to control the data input to the multiplier units to control the calculation unit to perform the multiplication of N bits based on the first data in response to the difference exceeding the threshold value, and control the data input to the multiplier units to control the calculation unit to perform the multiplication of N bits based on the second data and the difference in response to the difference being less than or equal to the threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

In this application, statements regarding calculating data refer to performing a calculation on the data according to a mathematical function or a polynomial approximating the mathematical function. For example, the data may be calculated by substituting the data into the mathematical function or the polynomial. Thus, statements regarding calculated data refer to data on which a calculation according to the mathematical function or the polynomial has been performed.

Figure 1:
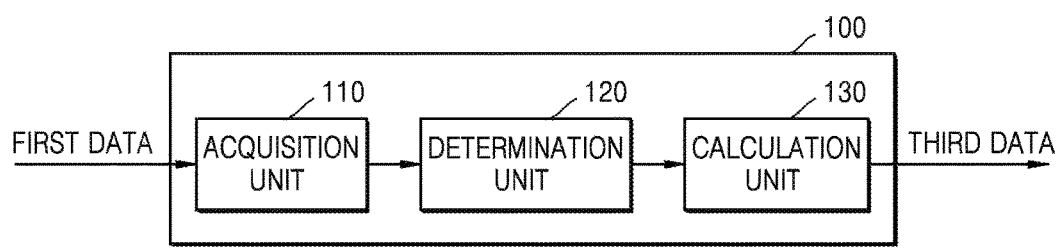
FIG. 1 is a block diagram of an example of a data calculation apparatus.

FIG. 1 is a block diagram of an example of a data calculation apparatus.

Referring to FIG. 1, a data calculation apparatus 100 includes an acquisition unit 110, a determination unit 120, and a calculation unit 130. Only components related to this example among the components of the data calculation apparatus 100 are shown in FIG. 1. It will be understood by one of ordinary skill in the art to which this example pertains that the data calculation apparatus 100 may include other general-use components in addition to the components illustrated in FIG. 1.

The acquisition unit 110, the determination unit 120, and the calculation unit 130 of the data calculation apparatus 100 of FIG. 1 may be implemented by a single processor or a plurality of processors. A processor may be implemented by an array of logic gates, or by a combination of a microprocessor and a memory in which a program to be executed by the microprocessor is stored. It will also be understood by one of ordinary skill in the art to which this example pertains that the processor may be implemented by other types of hardware.

The acquisition unit 110 acquires a difference between input first data and previously stored second data. The first data and the second data are data corresponding to numbers represented using a floating point method. For example, the first data and the second data may be strongly adjacent to each other. If the first data and the second data are strongly adjacent to each other, a result of a calculation of the first data and a result of a calculation of the second data may be the same as each other or very similar to each other. Since the first data and the second data respectively correspond to numbers represented using a floating point method, the difference between the first data and the second data acquired by the acquisition unit 110 may be represented as a predetermined number.

A central processing unit (CPU) or a graphics processing unit (GPU) may calculate a mathematical function based on input data. In other words, the CPU or the GPU may output a result of substituting a number represented using a floating point method into the mathematical function using the number as an operand. Examples of a mathematical function include a reciprocal function, a reciprocal square root function, a logarithmic function having a base of 2, an exponential function having a base of 2, a trigonometric function, and any other mathematical function known to one of ordinary skill in the art. If pieces of input data substituted into the mathematical function are within a certain range, the same or similar output results may be obtained. Examples of the mathematical function will now be described in detail with reference to FIGS. 2A and 2B.

Figure 2A:
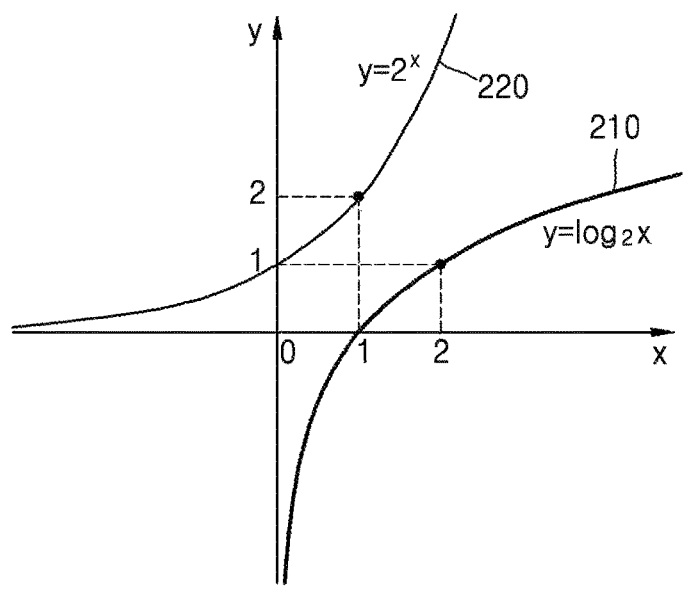
FIGS. 2A and 2B are views for explaining an example of a mathematical function and input data.
Figure 2B:
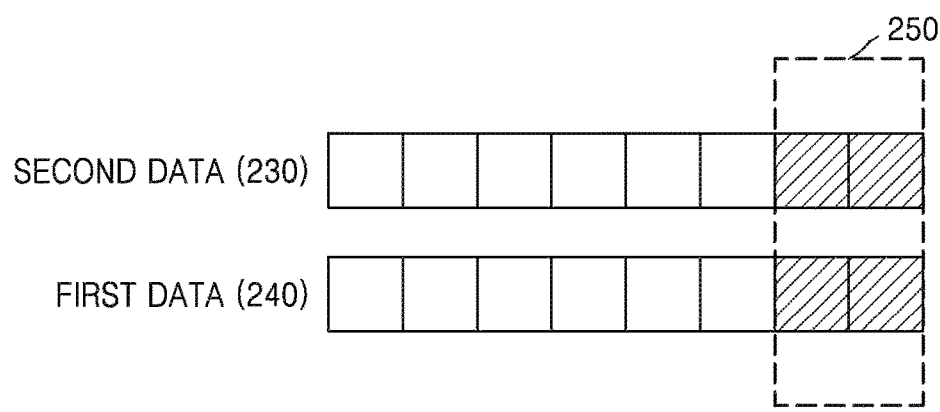

FIGS. 2A and 2B are views for explaining an example of a mathematical function and input data.

FIG. 2A illustrates a logarithmic function 210 having a base of 2 and an exponential function 220 having a base of 2, which are examples of a mathematical function. The logarithmic function 210 and the exponential function 220 of FIG. 2A are inverse functions of each other. FIG. 2B illustrates examples of second data 230, which is data previously input to a CPU or a GPU, and first data 240, which is data currently input thereto.

Pieces of output data obtained by the CPU or the GPU substituting pieces of input data into a mathematical function may have the same or similar values when the values of the pieces of input data are within a certain range. For example, assuming that the CPU generates output data by substituting input data into the logarithmic function 210, when a plurality of pieces of data within a section of the logarithmic function 210 having a small inclination are input to the CPU or GPU, a plurality of pieces of output data respectively corresponding to the plurality of pieces of input data may be the same as each other or very similar to each other.

In general, pieces of data that are consecutively input to a CPU or a GPU may be within a certain range. For example, assuming that the first data 240 is input to the GPU after the second data 230 is input thereto, the first data 240 and the second data 230 may be similar numbers within a certain range.

For example, if the second data 230 is 8-bit data corresponding to 10.000001 represented using a floating point method and the first data 240 is 8-bit data corresponding to 10.000010 represented using a floating point method, the second data 230 and the first data 240 are only different in terms of two lower bits 250 and have the same six upper bits.

Accordingly, a result obtained by the CPU or the GPU substituting the second data 230 into the mathematical function may be the same as or very similar to a result obtained by the CPU or the GPU substituting the first data 240 into the mathematical function. Thus, the CPU or the GPU may perform a calculation by substituting input data into a polynomial approximating the mathematical function. In this case, coefficients of the polynomial may be previously stored in a look-up table.

Figure 3:
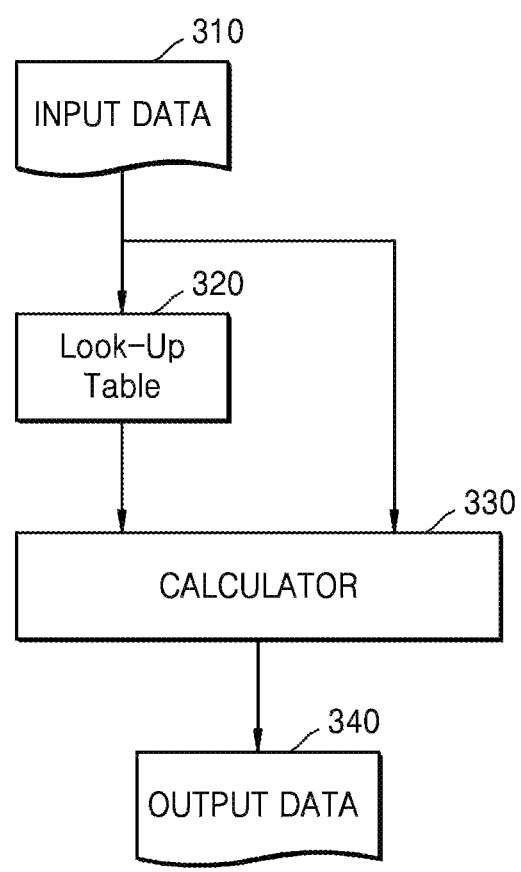
FIG. 3 is a block diagram for explaining an example of a calculation performed by a calculator included in a central processing unit (CPU) or a graphics processing unit (GPU) based on coefficients stored in a look-up table.

FIG. 3 is a block diagram for explaining an example of a calculation performed by a calculator included in a CPU or a GPU based on coefficients stored in a look-up table.

In general, a CPU or a GPU acquires a result corresponding to a mathematical function by substituting input data 310 into a polynomial. For example, assuming that the mathematical function is the logarithmic function 210 having a base of 2, the CPU or the GPU performs a calculation by substituting the input data 310 into a polynomial approximating the logarithmic function 210. In this case, coefficients needed for the polynomial calculation are stored in a look-up table 320.

When the input data 310 is input to the CPU or the GPU, the coefficients that are used in calculating the input data 310 are read from the look-up table 320. A calculator 330 performs a calculation based on the input data 310 and the coefficients read from the look-up table 320, and outputs output data 340 as a result of the calculation. Thus, the accuracy of the calculation performed by the calculator 330 may be increased by storing in the look-up table 320 coefficients corresponding to all pieces of input data 310 that may be input to the CPU or the GPU.

When pieces of data consecutively input to the CPU or the GPU are similar to each other, if current input data is calculated based on a difference between previous input data and the current input data, the amount of information that needs to be stored in the look-up table 320 may be reduced. The data calculation apparatus 100 calculates a difference between the previous input data and the current input data, and calculates the current input data based on the difference. Thus, the data calculation apparatus 100 may reduce the amount of information stored in a look-up table, and may also reduce the number of times that switching between logic gates occurs as a multiplication is performed.

Referring back to FIG. 1, the determination unit 120 determines a method of generating third data corresponding to a result of the calculation of the first data based on the acquired difference. The third data is data that is output by the data calculation apparatus 100 when the first data is input to the data calculation apparatus 100. In other words, the determination unit 120 determines a method of generating the third data when the first data is input. The method is determined based on the difference between the first data and the second data acquired by the acquisition unit 110.

For example, the determination unit 120 receives the difference between the first data and the second data from the acquisition unit 110 and compares the received difference with a predetermined threshold value. Then, the determination unit 120 determines a method of generating the third data based on a result of the comparison.

If the difference between the first data and the second data exceeds the threshold value, the determination unit 120 selects a method (hereinafter referred to as a whole calculation) of performing a calculation based on the first data. If the difference between the first data and the second data is less than or equal to the threshold value, the determination unit 120 selects a method (hereinafter referred to as a difference calculation) of performing a calculation based on the difference between the first data and the second data and a result of a calculation of the second data.

The calculation unit 130 performs a calculation corresponding to the method determined by the determination unit 120 using at least one calculator. In other words, the calculation unit 130 may generate the third data via the whole calculation or the difference calculation.

In the difference calculation, coefficients determined based on the first data or the difference between the first data and the second data may be used. The coefficients may be read from the look-up table included in the data calculation apparatus 100, and may be mapped in correspondence to the first data or the difference between the first data and the second data within the look-up table.

The calculation unit 130 performs a calculation using at least one calculator included in the data calculation apparatus 100. For example, the calculation unit 130 may perform a calculation using a single calculator, or may perform a calculation using a first calculator for use in performing a whole calculation or a second calculator for use in performing a difference calculation. When the calculation unit 130 performs a calculation using a single calculator, the calculation unit 130 may perform a calculation using only a part of the single calculator. In this case, the single calculator may be a multi-precision calculator capable of performing a multiplication of N bits and a multiplication of N/2 bits, but is not limited thereto.

An example in which the determination unit 120 determines a calculation method and the calculation unit 130 performs a calculation will now be described with reference to FIG. 4.

Figure 4:
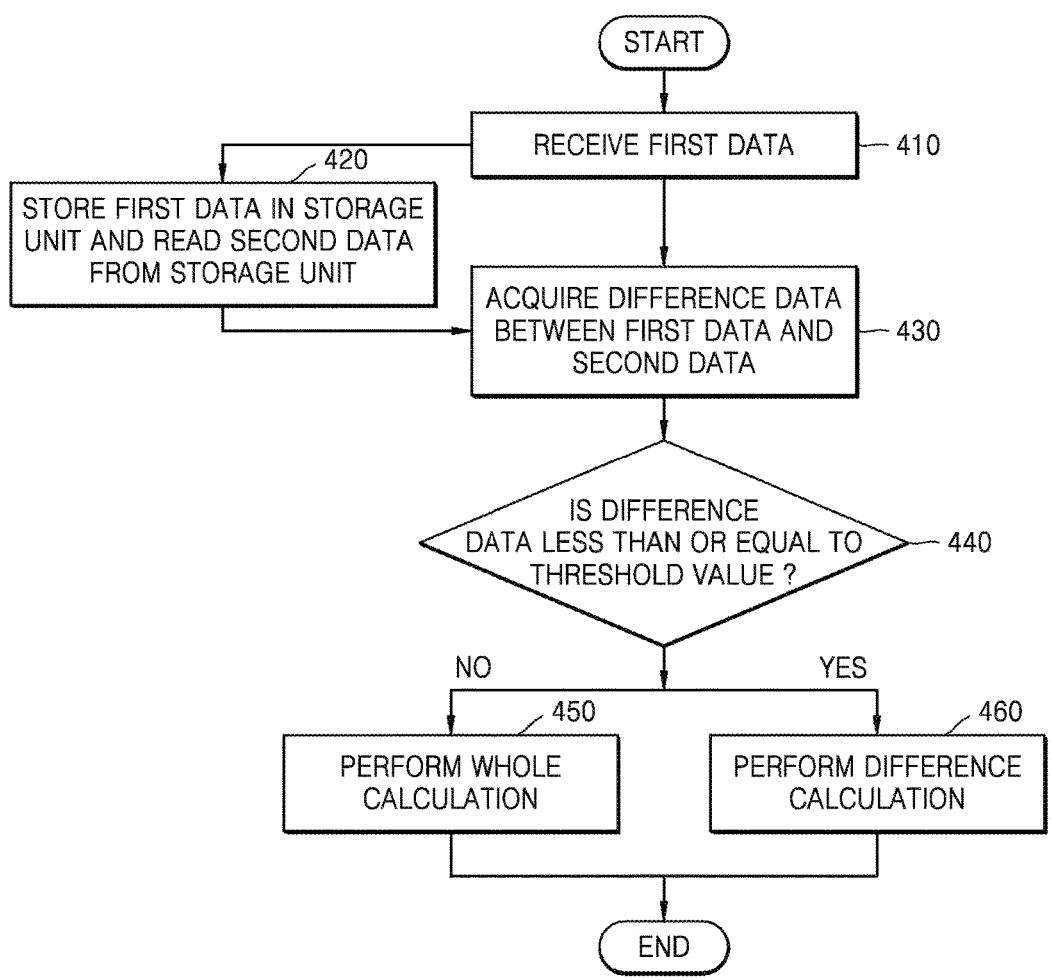
FIG. 4 is a flowchart of an example of a method operation of the data calculation apparatus of FIG. 1.

FIG. 4 is a flowchart of an example of a method of operation of the data calculation apparatus of FIG. 1.

The operations illustrated in FIG. 4 are operations that are sequentially performed by the data calculation apparatus 100 of FIG. 1. Thus, although omitted here, the above description of the data calculation apparatus 100 of FIG. 1 is also applicable to the method illustrated in FIG. 4.

In operation 410, the acquisition unit 110 receives the first data. In other words, the first data is input to the data calculation apparatus 100. The first data is data that is to be calculated by the data calculation apparatus 100, and may be, for example, data that is processed by a shader included in a GPU. For example, the first data may correspond to a number represented using a floating point method, but is not limited thereto.

In operation 420, the first data is stored in a storage unit included in the data calculation apparatus 100, and the second data is read from the storage unit. The second data is data that was input to the data calculation apparatus 100 right before the first data is input to the data calculation apparatus 100. In other words, the first data is sequentially input to the data calculation apparatus 100 after the second data is input thereto.

In operation 430, the acquisition unit 110 acquires difference data between the first data and the second data. The difference data is data corresponding to the difference between the first data and the second data, or a variation between the first data and the second data. Since the first data and the second data may be respectively data corresponding to numbers represented using a floating point method, the acquisition unit 110 may acquire the difference data based on the first data and the second data.

For example, the acquisition unit 110 may acquire the difference data according to Equation 1 below.

$$a_{diff} = a_{n+1} - a_n \quad (1)$$

In Equation 1, $a_{diff}$ denotes the difference data, $a_{n+1}$ denotes the first data, and $a_n$ denotes the second data.

In operation 440, the determination unit 120 determines whether the difference data is less than or equal to the threshold value. The threshold value may be previously set by a user, or may be automatically set by the data calculation apparatus 100 without intervention of the user. In this case, the threshold value may be set according to the accuracy that is desired for a result of a data calculation.

If it is determined in operation 440 that the difference data exceeds the threshold value, the method proceeds to operation 450. If it is determined that the difference data is less than or equal to the threshold value, the method proceeds to operation 460.

In operation 450, the calculation unit 130 performs a whole calculation. In other words, the determination unit 120 determines a method (i.e., a whole calculation) of performing a calculation based on the first data as a method of generating the third data, and the calculation unit 130 performs the whole calculation to generate the third data. For example, the calculation unit 130 may generate the third data by substituting the first data into a mathematical function, or may generate the third data by substituting the first data into a polynomial approximating the mathematical function.

In operation 460, the calculation unit 130 performs a difference calculation. In other words, the determination unit 120 determines a method (i.e., a difference calculation) of performing a calculation based on the difference data as a method of generating the third data, and the calculation unit 130 performs the difference calculation to generate the third data.

For example, the calculation unit 130 may perform the difference calculation according to Equation 2 below.

$$c^* a_{n+1} = c^* a_n + c^* a_{diff} \quad (2)$$

In Equation 2, $c^* a_{n+1}$ denotes the third data, $a_n$ denotes the second data, $a_{diff}$ denotes the difference data, and c denotes a coefficient read from a look-up table. The calculation unit 130 may read the coefficient c from the look-up table based on the first data, or the look-up table may output the coefficient c in response to the first data.

According to Equation 2, the calculation unit 130 performs a calculation of generating the third data based on the second data, the difference data, and the coefficient read from the look-up table. Thus, since the calculation unit 130 does not need to calculate the entire polynomial approximating the mathematical function, the number of times that switching between logic gates occurs when the calculation unit 130 operates is reduced.

Figure 5:
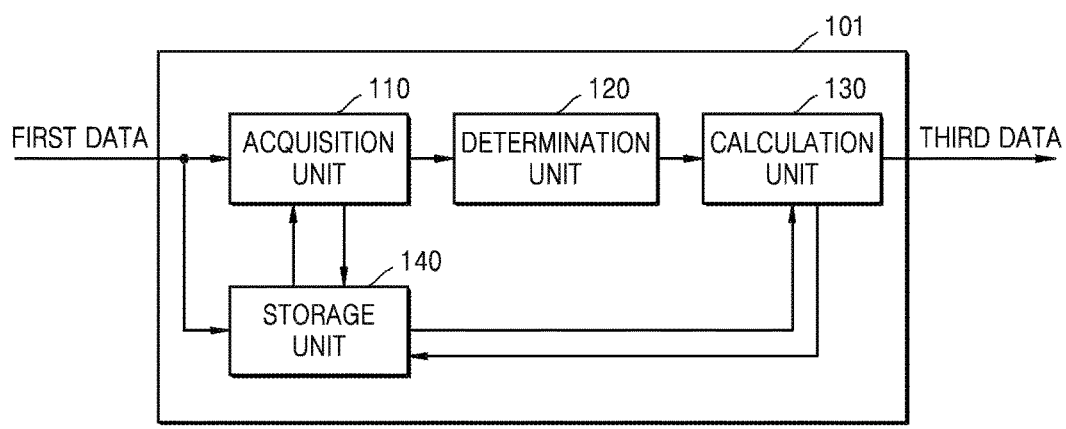
FIG. 5 is a block diagram of another example of a data calculation apparatus.

FIG. 5 is a block diagram of another example of a data calculation apparatus.

Referring to FIG. 5, a data calculation apparatus 101 includes an acquisition unit 110, a determination unit 120, a calculation unit 130, and a storage unit 140. Only components related to this example among the components of the data calculation apparatus 101 are shown in FIG. 5. It will be understood by one of ordinary skill in the art to which this example pertains that the data calculation apparatus 101 may include other general-use components in addition to the components illustrated in FIG. 5.

The acquisition unit 110, the determination unit 120, and the calculation unit 130 of the data calculation apparatus 101 of FIG. 5 may be implemented by a single processor or a plurality of processors. A processor may be implemented by an array of logic gates, or by a combination of a microprocessor and a memory in which a program to be executed by the microprocessor is stored. It will also be understood by one of ordinary skill in the art to which this example pertains that the processor may be implemented by other types of hardware.

The acquisition unit 110, the determination unit 120, and the calculation unit 130 of the data calculation apparatus 101 of FIG. 5 are the same as the acquisition unit 110, the determination unit 120, and the calculation unit 130 of the data calculation apparatus 100 of FIG. 1, respectively. Thus, a repeated description thereof will be omitted.

The storage unit 140 stores difference data and first data. The storage unit 140 also stores second data. In other words, the storage unit 140 stores data that is input to the data calculation apparatus 101. In one example, the storage unit 140 stores first data and second data input to the data calculation apparatus 101, receives difference data from the acquisition unit 110, and stores the difference data. The storage unit 140 provides stored information to the calculation unit 130 according to a method in which the calculation unit 130 operates (for example, a whole calculation or a difference calculation), and receives the third data from the calculation unit 130 and stores the third data.

A look-up table may be stored in the storage unit 140, or may be provided as a separate component in the data calculation apparatus 101. Storing, in the look-up table, coefficients used when the calculation unit 130 performs a calculation has been described above with reference to FIG. 4. An example in which a storage unit 140 and a look-up table 150 are included as separate components in a data calculation apparatus 102 will now be described with reference to FIG. 6.

Figure 6:
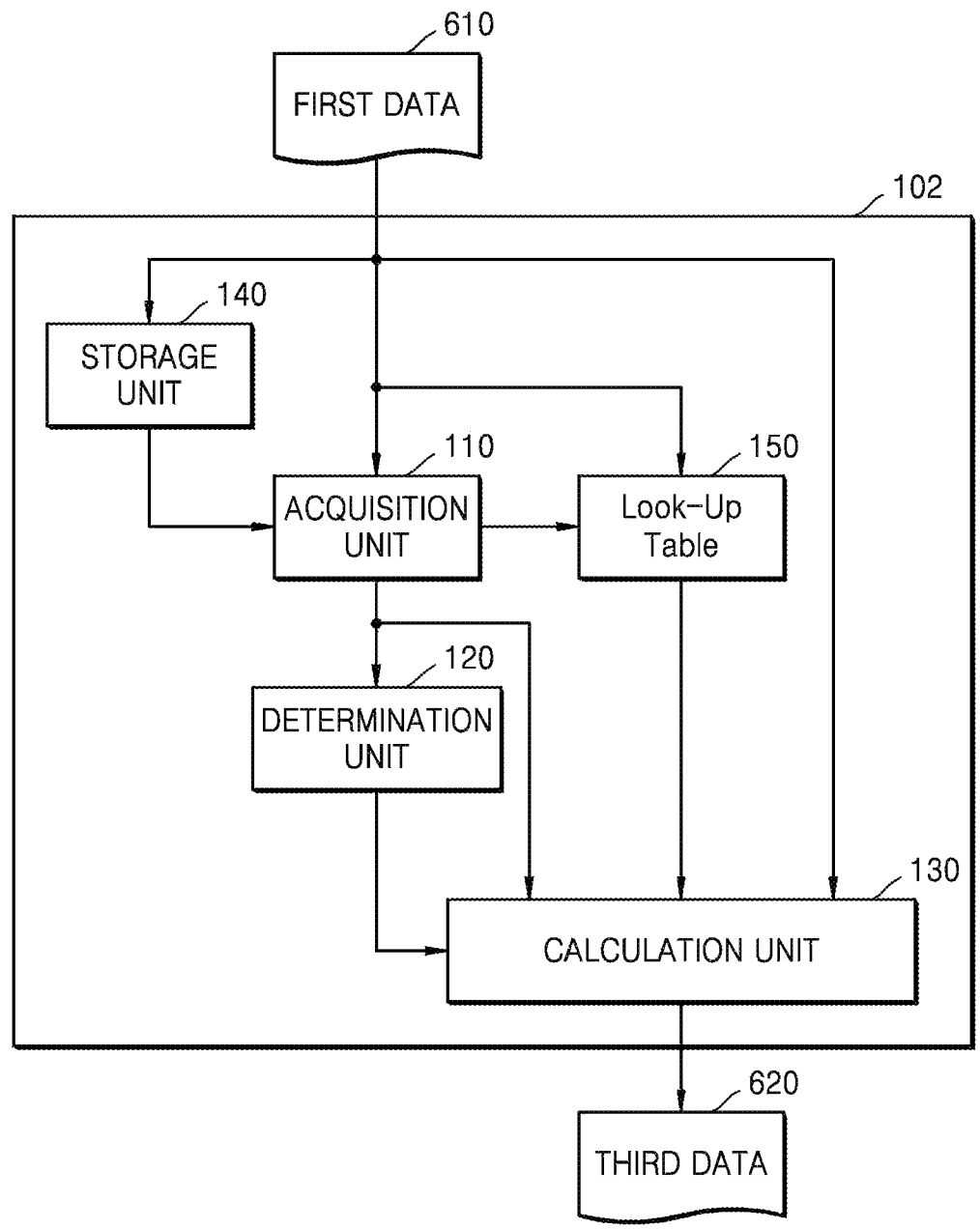
FIG. 6 is a block diagram of another example of a data calculation apparatus.

FIG. 6 is a block diagram of another example of a data calculation apparatus 102.

Referring to FIG. 6, the data calculation apparatus 102 includes an acquisition unit 110, a determination unit 120, a calculation unit 130, the storage unit 140, and the look-up table 150. Only components related to this example among the components of the data calculation apparatus 102 are shown in FIG. 6. It will be understood by one of ordinary skill in the art to which this example pertains that the data calculation apparatus 102 may include other general-use components in addition to the components illustrated in FIG. 6.

The acquisition unit 110, the determination unit 120, and the calculation unit 130 of the data calculation apparatus 102 of FIG. 6 may be implemented by a single processor or a plurality of processors. A processor may be implemented by an array of logic gates, or by a combination of a microprocessor and a memory in which a program to be executed by the microprocessor is stored. It will also be understood by one of ordinary skill in the art to which this example pertains that the processor may be implemented by other types of hardware.

In contrast to the data calculation apparatus 101 of FIG. 5, the data calculation apparatus 102 of FIG. 6 includes the storage unit 140 and the look-up table 150 as separate components.

The acquisition unit 110 receives first data 610. In other words, the first data 610 is input to the data calculation apparatus 102. The first data 610 is stored in the storage unit 140 and transmitted to the calculation unit 130. The first data 610 is also transmitted to the look-up table 150 and is used as an input for reading a coefficient.

The storage unit 140 transmits previously stored second data to the acquisition unit 110. In other words, the storage unit 140 already stores the second data that was input to the data calculation apparatus 102 right before the first data 610 is input thereto. When the first data 610 is input, the storage unit 140 transmits the previously stored second data to the acquisition unit 110.

The acquisition unit 110 acquires difference data between the first data 610 and the second data. In one example, the acquisition unit 110 acquires the difference data according to Equation 1 described above. The acquisition unit 110 transmits the difference data to the determination unit 120 and the calculation unit 130.

The determination unit 120 determines whether the difference data is less than or equal to a threshold value. As described above with reference to FIG. 4, the threshold value may be previously set by a user, or may be automatically set by the data calculation apparatus 102 without an intervention of the user.

If the determination unit 120 determines that the difference data exceeds the threshold value, the determination unit 120 instructs the calculation unit 130 to perform a whole calculation. If the determination unit 120 determines that the difference data is less than or equal to the threshold value, the determination unit 120 instructs the calculation unit 130 to perform a difference calculation.

The calculation unit 130 performs the whole calculation or the difference calculation according to the instruction of the determination unit 120. As described above with reference to FIG. 4, the calculation unit 130 may perform the whole calculation by substituting the first data 610 into a polynomial approximating a mathematical function.

The look-up table 150 outputs a coefficient based on the first data 610, and transmits the coefficient to the calculation unit 130. Accordingly, the calculation unit 130 performs the difference calculation based on the first data 610, the difference data received from the acquisition unit 110, and the coefficient received from the look-up table 150. For example, the calculation unit 130 may perform the difference calculation according to Equation 2 described above. The calculation unit 130 generates third data 620 by performing the whole calculation or the difference calculation according to the method determined by the determination unit 120.

The calculation unit 130 may perform the whole calculation or the difference calculation using a single calculator. In this case, the calculation unit 130 may perform the difference calculation using only a part of the single calculator. For example, the single calculator may be a multi-precision calculator capable of performing a multiplication of N bits and a multiplication of N/2 bits.

Alternatively, the calculation unit 130 may perform the whole calculation or the difference calculation using a plurality of calculators. In other words, the calculation unit 130 may include a calculator for use in performing a whole calculation and a calculator for use in performing a difference calculation.

An example of a single calculator included in the calculation unit 130 will now be described with reference to FIG. 7, and an example in which the calculation unit 130 performs a whole calculation or a difference calculation using a plurality of calculators will later be described with reference to FIG. 8.

Figure 7:
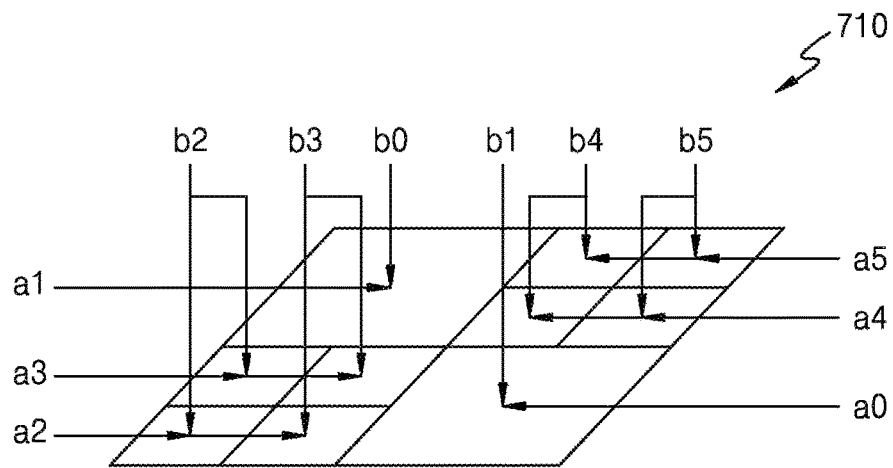
FIG. 7 is a view for explaining an example of a single calculator included in a calculation unit.

FIG. 7 is a view for explaining an example of a single calculator included in a calculation unit.

FIG. 7 illustrates an example of a partial-multiplication generator 710 included in a multi-precision calculator. In this example, the multi-precision calculator is capable of performing a multiplication of N bits and a multiplication of N/2 bits, wherein N denotes a natural number equal to or greater than 2. It will now be assumed that N-bit input data and N/2-bit input data have adjacency.

For example, assuming that a multiplication of N bits is performed, a multiplier used in the multiplication is $A=\{A_{N-1}, A_{N-2}, \ldots, A_0\}$, and a multiplicand used in the multiplication is $B=\{B_{N-1}, B_{N-2}, \ldots, B_0\}$, examples of data a0, a1, ..., a5, b0, b1, ..., and b5 input to the partial-multiplication generator 710 of FIG. 7 are as follows:

$a0=\{A_{N-1}, \ldots, A_{N/2}\}$ $a1=\{A_{N/2-1}, \ldots, A_0\}$ a2={AN-1, ..., A3N/4}
a3={A3N/4-1, ..., AN/2}
a4={AN/2-1, ..., AN/4}
a5={AN/4-1, ..., A0}
b0={BN-1, ..., BN/2}
b1={BN/2-1, ..., B0}
b2={BN-1, ..., B3N/4}
b3={B3N/4-1, ..., BN/2}
b4={BN/2-1, ..., BN/4}
b5={BN/4-1, ..., B0}

In another example, assuming that a multiplication of N/2 bits is performed, a first multiplier used in the multiplication is A={AN/2-1, AN/2-2, ..., A0}, a first multiplicand used therein is B={BN/2-1, BN/2-2, ..., B0}, a second multiplier used therein is C={CN/2-1, CN/2-2, ..., C0}, and a second multiplicand used therein is D={DN/2-1, DN/2-2, ..., D0}, examples of data a0, a1, ..., a5, b0, b1, ..., and b5 input to the partial-multiplication generator 710 of FIG. 7 are as follows:

a0=0
a1=0
a2={AN/2-1, ..., AN/4}
a3={AN/4-1, ..., A0}
a4={CN/2-1, ..., CN/4}
a5={CN/4-1, ..., C0}
b0=0
b1=0
b2={BN/2-1, ..., BN/4}
b3={BN/4-1, ..., B0}
b4={DN/2-1, ..., DN/4}
b5={DN/4-1, ..., D0}

When a multiplication of N bits and a multiplication of N/2 bits are performed, the data a0, a1, ..., a5, b0, b1, ..., and b5 as described in the above examples are selectively input to the partial-multiplication generator 710 by a multiplexer under control of the determination unit 120 illustrated in FIGS. 1, 6, and 7. The determination unit 120 controls the multiplexer to control the multi-precision calculator to perform a multiplication of N bits when the difference acquired by the acquisition unit 110 illustrated in FIGS. 1, 6, and 7 is greater than the threshold value, and controls the multiplexer to control the multi-precision calculator to perform a multiplication of N/2 bits when the difference is less than or equal to the threshold value. Accordingly, when the single calculator, namely, the multi-precision calculator, performs a multiplication of N bits and a multiplication of N/2 bits, only changed values of lower bits may be independently accumulated. Thus, the number of calculations that are to be performed by the single calculator may be reduced, and the number of times that switching between logic gates occurs during a calculation may also be reduced.

Figure 8:
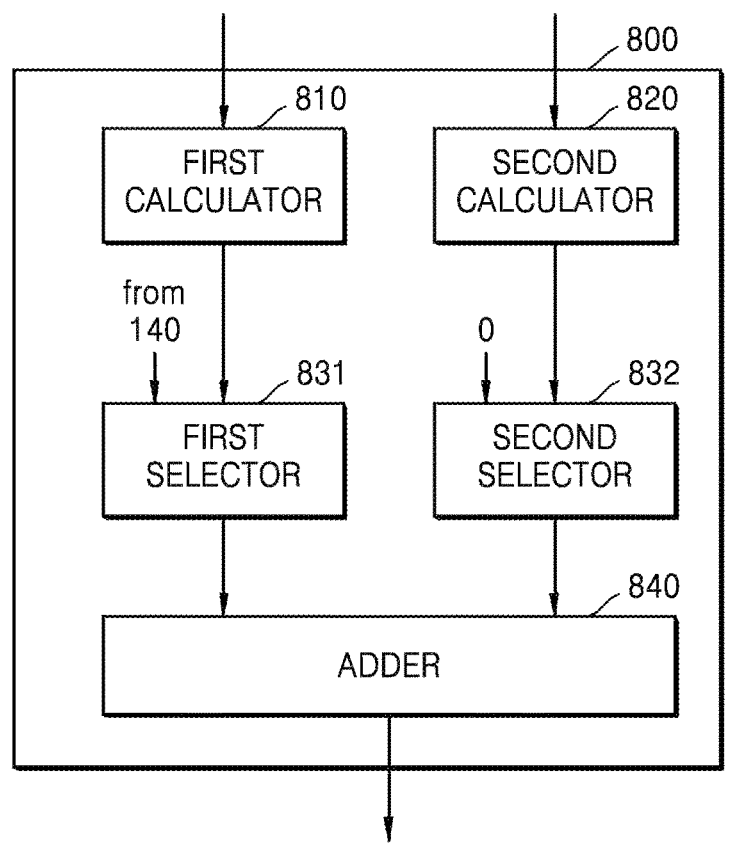
FIG. 8 is a block diagram for explaining an example in which a calculation unit performs a calculation using a plurality of calculators.

FIG. 8 is a block diagram for explaining an example in which a calculation unit performs a calculation using a plurality of calculators.

FIG. 8 illustrates an example of a calculation unit 800 including a first calculator 810 used to perform a whole calculation, and a second calculator 820 used to perform a difference calculation. In the example illustrated in FIG. 8, the calculation unit 800 also includes a first selector 831, a second selector 832, and an adder 840 in addition to the first calculator 810 and the second calculator 820.

The first calculator 810, the second calculator 820, the first selector 831, the second selector 832, and the adder 840 of FIG. 8 may be implemented by a single processor or a plurality of processors. A processor may be implemented by an array of logic gates, or by a combination of a microprocessor and a memory in which a program to be executed by the microprocessor is stored. It will also be understood by one of ordinary skill in the art to which this example pertains that the processor may be implemented by other types of hardware.

The first calculation unit 810 performs a whole calculation. For example, the first calculator 810 performs a calculation necessary for generating the third data based on the first data. In other words, the first calculator 810 generates the third data $c*a_{n+1}$ by substituting the first data $a_{n+1}$ into a polynomial approximating a mathematical function. The second calculator 820 generates the data $c*a_{diff}$ necessary for a difference calculation.

As necessary, the coefficient c read from the look-up table is input to the first calculator 810 and the second calculator 820 to be used in calculations.

The first selector 831 selects either data read from the storage unit 140 or the third data $c*a_{n+1}$ generated by the first calculator 810. The data read from the storage unit 140 is data $c*a_n$ obtained by multiplying the second data $a_n$ by the coefficient c, which has been previously calculated, either by the whole calculation or the difference calculation, and stored in the storage unit 140. That is, the data $c*a_n$ that is read from the data storage unit 140 is the third data $c*a_{n+1}$ that was calculated in the previous calculation. The second selector 832 selects either 0 input to the second selector 832 or the data $c*a_{diff}$ generated by the second calculator 820 by multiplying the difference data $a_{diff}$ by the coefficient c.

In one example, when the determination unit 120 determines that the third data $c*a_{n+1}$ is to be generated according to a whole calculation, the first calculator 810 operates, and the second calculator 820 does not operate. At this time, the first selector 831 selects the third data $c*a_{n+1}$ generated by the first calculator 810, and the second selector 832 selects 0.

In another example, when the determination unit 120 determines that the third data $c*a_{n+1}$ is to be generated according to a difference calculation, the second calculator 820 operates, and the first calculator 810 does not operate. At this time, the second selector 832 selects the data $c*a_{diff}$ generated by the second calculator 820, and the first selector 831 selects the data $c*a_n$ read from the storage unit 140.

The adder 840 adds pieces of data that are respectively received from the first selector 831 and the second selector 832.

In one example, when the determination unit 120 determines that the third data $c*a_{n+1}$ is to be generated according to a whole calculation, the adder 840 adds the third data $c*a_{n+1}$ received from the first selector 831 to 0 received from the second selector 832. Consequently, the adder 840 outputs the third data $c*a_{n+1}$ generated by the first calculator 810.

In another example, when the determination unit 120 determines that the third data $c*a_{n+1}$ is to be generated according to a difference calculation, the adder 840 adds the data $c*a_n$ received from the first selector 831 to the data $c*a_{diff}$ received from the second selector 832. Consequently, the adder 840 outputs the third data $c*a_{n+1}$ obtained according to the difference calculation.

Figure 9:
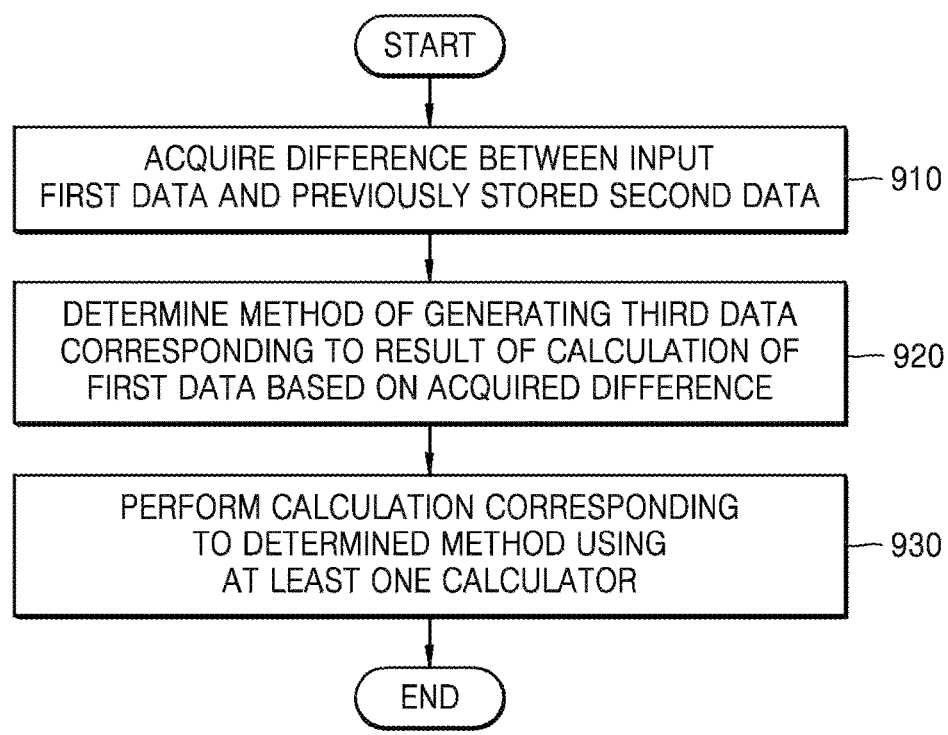
FIG. 9 is a flowchart of an example of a data calculation method.

FIG. 9 is a flowchart of an example of a data calculation method.

Referring to FIG. 9, the data calculation method includes the operations sequentially performed by the data calculation apparatuses 100, 101, and 102 of FIGS. 1, 6, and 7. Thus, although omitted here, the above descriptions of the data calculation apparatuses 100, 101, and 102 of FIGS. 1, 6, and 7 are also applicable to the data calculation method of FIG. 9.

In operation 910, the acquisition unit 110 acquires a difference between input first data and previously stored second data. The first data and the second data are data corresponding to numbers represented using a floating point method. The first data is sequentially input to the data calculation apparatus 100 after the second data is input thereto.

In operation 920, the determination unit 120 determines a method of generating third data corresponding to a result of a calculation of the first data based on the acquired difference. In other words, the determination unit 120 determines, based on the difference, either a first method (i.e., a whole calculation) of generating the third data based on an entirety of the first data, or a second method (i.e., a difference calculation) of generating the third data based on a product of the difference acquired in operation 910 and a coefficient determined according to the first data and a product of the second data and the coefficient. The second method may be a method of generating the third data according to Equation 2 described above.

In operation 930, the calculation unit 130 performs a calculation corresponding to the method determined in operation 920 using at least one calculator. For example, the calculation unit 130 may perform the whole calculation or the difference calculation using a single calculator as described above with respect to FIG. 7. The single calculator may be a multi-precision calculator. Alternatively, the calculation unit 130 may perform the whole calculation or the difference calculation using a plurality of calculators as described above with respect to FIG. 8.

Figure 10:
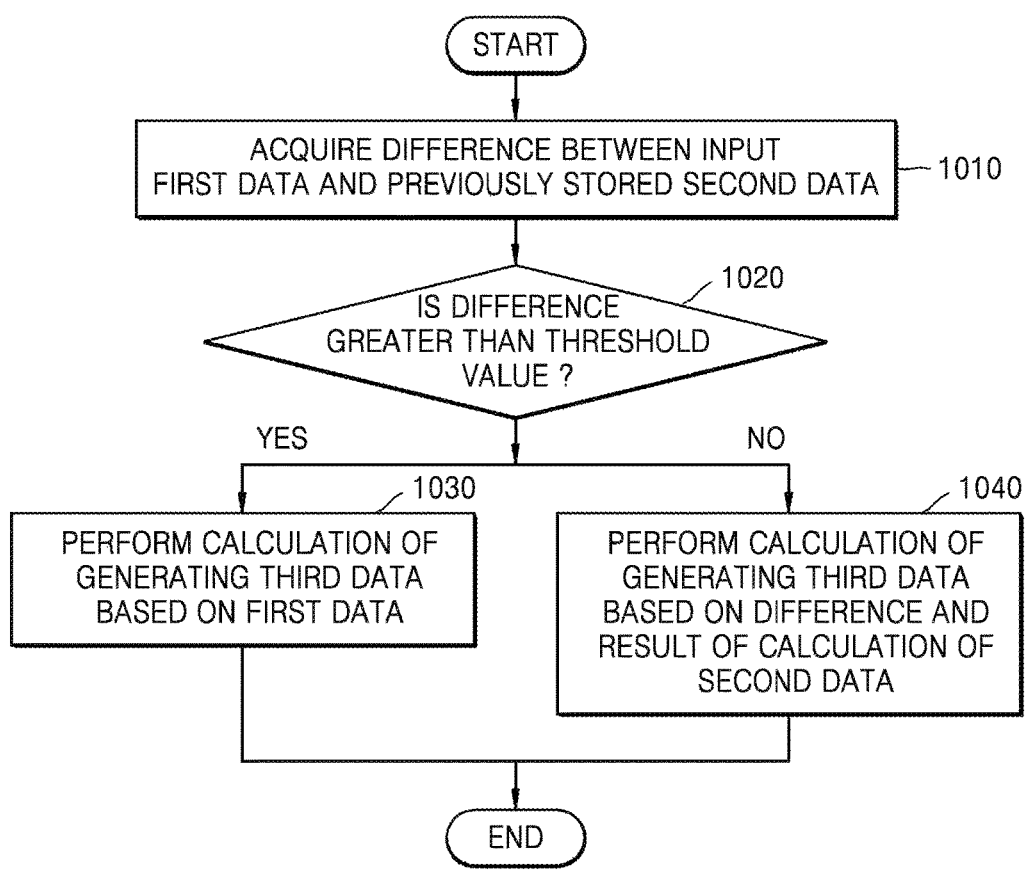
FIG. 10 is a flowchart of another example of a data calculation method.

FIG. 10 is a flowchart of another example of a data calculation method.

Referring to FIG. 10, the data calculation method includes the operations sequentially performed by the data calculation apparatuses 100, 101, and 102 of FIGS. 1, 6, and 7. Thus, although omitted here, the above descriptions of the data calculation apparatuses 100, 101, and 102 of FIGS. 1, 6, and 7 are also applicable to the data calculation method of FIG. 10.

Operation 1010 of FIG. 10 is the same as operation 910 of FIG. 9, and thus a detailed description thereof will be omitted.

In operation 1020, the determination unit 120 compares a difference acquired in operation 1010 with a threshold value. The threshold value may be previously set by a user, or may be automatically set by the data calculation apparatus 100 without intervention of the user. In this case, the threshold value may be set according to the accuracy that is desired for a result of a data calculation.

If it is determined in operation 1020 that the difference exceeds the threshold value, the method proceeds to operation 1030. If it is determined in operation 1020 that the difference is less than or equal to the threshold value, the method proceeds to operation 1040.

In operation 1030, the calculation unit 130 performs a calculation of generating third data based on the first data. For example, the calculation unit 130 may generate the third data by substituting the first data into a mathematical function, or may generate the third data by substituting the first data into a polynomial approximating the mathematical function.

In operation 1040, the calculation unit 130 performs a calculation of generating the third data based on the difference acquired in operation 1010 and a result of a calculation of the second data. For example, the calculation unit 130 may acquire the third data by performing a calculation according to Equation 2 described above.

As described above with reference to operation 930 of FIG. 9, the calculation unit 130 performing operations 1030 and 1040 may include a single calculator or a plurality of calculators.

As described above, the data calculation apparatus 100 calculates the difference between the previous input data and the current input data and calculates the current input data based on the difference. Thus, the data calculation apparatus 100 may reduce the amount of information stored in a look-up table, and may also reduce the number of times that switching between logic gates occurs as a multiplication is performed.

The acquisition unit 110, the determination unit 120, and the calculation unit 130 illustrated in FIGS. 1, 6, and 7, the look-up tables 320 and 150 in FIGS. 3 and 6, the calculator 330 in FIG. 3, the calculation unit 130 and the storage unit 140 in FIGS. 5 and 6, and the first calculator 810, the second calculator 820, the selector 830, and the adder 840 in FIG. 8 that perform the operations described herein with respect to FIGS. 1-10 are implemented by hardware components. Examples of hardware components include controllers, generators, drivers, memories, and any other electronic components known to one of ordinary skill in the art. In one example, the hardware components are implemented computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-10. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 4, 9, and 10 that perform the operations described herein with respect to FIGS. 1-10 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Thus, the examples described herein are to be considered in a descriptive sense only, and not for purposes of limitation, and descriptions of features or aspects within each example are to be considered as being applicable to other similar features or aspects in other examples. Therefore, the scope of the disclosure is defined not by the detailed description, but by the claims and their equivalents, and all variations within the scope of the claims and their equivalents are to be construed as being included in the disclosure.

What is claimed is:

1. A method of calculating data using a calculation unit that includes an adder, first and second selectors, and first and second calculators, the adder being configured to receive outputs of the first and second selectors, respectively, the first selector being configured to receive a first input and an output of the first calculator, the second selector being configured to receive a second input and an output of the second calculator, the method comprising:
    acquiring a difference between first data that is input and second data that was previously stored;
    selecting, based on the difference, a process from among a first process of generating third data and a second process of generating the third data; and
    performing the selected process,
    the third data corresponding to a result of performing a mathematical operation on the first data,
    the first process including,
        calculating, using the first calculator, an output of a first mathematical function using the first data as an input to the first mathematical function,
        selecting, using the first selector, the output of the first calculator and providing the output of the first calculator to the adder,
        selecting, using the second selector, the second input and providing the second input to the adder, and
        generating the third data by adding, using the adder, the output of the first calculator to the second input,
    the second process including,
        calculating, using the second calculator, the output of a first mathematical function using the difference as an input to the first mathematical function,
        selecting, using the first selector, the first input and providing the first input to the adder,
        selecting, using the second selector, an output of the second calculator and providing the output of the second calculator to the adder, and
        generating the third data by adding, using the adder, the first input to the output of the second calculator,
    a first number of calculations included in the second process being less than a second number of calculations included in the first process.

2. The method of claim 1, wherein the selecting comprises:
    comparing the difference with a threshold value, and
    selecting from among the first process and the second process, based on a result of the comparing.

3. The method of claim 2, wherein the selecting comprises:
    selecting the first process in response to the difference exceeding the threshold value; and
    selecting the second process in response to the difference being less than or equal to the threshold value.

4. The method of claim 1, wherein the performing of the selected process comprises:
    generating the third data based on the difference or a coefficient determined based on the first data.

5. The method of claim 4, wherein the determined coefficient is selected from coefficients stored in correspondence to the difference or the first data.

6. The method of claim 1, wherein the first process further includes performing one or more of the first number of calculations based on an entirety of the first data, and the second process further includes adding a product of the difference and a coefficient determined based on the first data to a product of the second data and the coefficient.

7. The method of claim 1, further comprising
    storing the difference and the first data.

8. The method of claim 1, wherein the performing of the selected process comprises performing calculations using either all or only a part of a single calculator according to the selected process.

9. The method of claim 8, wherein the single calculator is a multi-precision calculator configured to perform a multiplication of N bits and a multiplication of N/2 bits.

10. The method of claim 1, wherein the performing of the selected process comprises:
selecting a calculator from among different calculators according to the selected process, and performing the calculation using the selected calculator.

11. The method of claim 1, wherein the first data and the second data correspond to numbers represented using a floating point process.

12. A non-transitory computer-readable storage medium storing instructions to cause computing hardware to perform the method of claim 1.

13. An apparatus for calculating data, the apparatus comprising:
a processor, the processor including,
an acquisition circuit configured to acquire a difference between first data that is input and second data that was previously stored;
a determination circuit configured to select, based on the difference, a process from among a first process of generating third data and a second process of generating the third data; and
a calculation circuit configured to perform the selected process, the calculation circuit including an adder, first and second selectors, and first and second calculators, the adder being configured to receive outputs of the first and second selectors, respectively, the first selector being configured to receive a first input and an output of the first calculator, the second selector being configured to receive a second input and an output of the second calculator,
the third data corresponding to a result of performing a mathematical operation on the first data,
the calculation circuit being configured such that,
performing the first process includes,
calculating, using the first calculator, an output of a first mathematical function using the first data as an input to the first mathematical function,
selecting, using the first selector, the output of the first calculator and providing the output of the first calculator to the adder,
selecting, using the second selector, the second input and providing the second input to the adder, and
generating the third data by adding, using the adder, the output of the first calculator to the second input, and
performing the second process includes,
calculating, using the second calculator, the output of a first mathematical function using the difference as an input to the first mathematical function,
selecting, using the first selector, the first input and providing the first input to the adder,
selecting, using the second selector, an output of the second calculator and providing the output of the second calculator to the adder, and
generating the third data by adding, using the adder, the first input to the output of the second calculator,
the calculation circuit being further configured such that a first number of calculations included in the second process is less than a second number of calculations included in the first process.

14. The apparatus of claim 13, wherein the determination circuit is further configured to compare the difference with a threshold value, and perform the selecting from among the first process and the second process based on a result of the comparing.

15. The apparatus of claim 14, wherein the calculation circuit is further configured to select the first process in response to the difference exceeding the threshold value, and select the second process in response to the difference being less than or equal to the threshold value.

16. The apparatus of claim 13, wherein the calculation circuit is further configured to perform the selected process based on the difference or a coefficient determined based on the first data.

17. The apparatus of claim 16, wherein the determined coefficient is selected from coefficients stored in correspondence to the difference or the first data.

18. The apparatus of claim 13, wherein the first process further includes performing one or more of the first number of calculations based on an entirety of the first data, and the second process further includes adding a product of the difference and a coefficient determined based on the first data to a product of the second data and the coefficient.

19. The apparatus of claim 13, further comprising a storage unit configured to store the difference and the first data.

20. The apparatus of claim 13, wherein the calculation circuit comprises a single calculator, and is further configured to perform the selected process using either all or only a part of the single calculator according to the selected process.

21. The apparatus of claim 20, wherein the single calculator is a multi-precision calculator configured to perform a multiplication of N bits and a multiplication of N/2 bits.

22. The apparatus of claim 13, wherein,
the calculation circuit comprises different calculators; and
the calculation circuit is further configured to select a calculator from among the different calculators according to the selected process, and generate the third data using the selected calculator.

23. The apparatus of claim 13, wherein the first data and the second data correspond to numbers represented using a floating point process.

24. An apparatus for calculating data, the apparatus comprising:
a processor including,
an acquisition circuit configured to acquire a difference between first data that is input and second data that was previously stored;
a calculation circuit including multiplier inputs, an adder, first and second selectors, and first and second calculators, the adder being configured to receive outputs of the first and second selectors, respectively, the first selector being configured to receive a first input and an output of the first calculator, the second selector being configured to receive a second input and an output of the second calculator; and
a determination circuit configured to,
determine a process of generating third data based on the difference, the third data corresponding to a result of performing a mathematical operation on the first data, and
control data input to the multiplier inputs to control the calculation circuit to perform a calculation according to the determined process, wherein the determination circuit is configured such that the determining of the process includes selecting, based on the difference, between,
- a first process including generating the third data by controlling the calculation circuit to perform a first number of calculations based on the first data using a first precision level, and
- a second process including generating the third data by controlling the calculation circuit to perform a second number of calculations based on the difference using a second precision level,
- the second precision level being lower than the first precision level such that the second number of calculations is less than the first number of calculations, wherein the calculation circuit is configured such that generating the third data in accordance with the first process includes,
- calculating, using the first calculator, an output of a first mathematical function using the first data as an input to the first mathematical function,
- selecting, using the first selector, the output of the first calculator and providing the output of the first calculator to the adder,
- selecting, using the second selector, the second input and providing the second input to the adder, and
- generating the third data by adding, using the adder, the output of the first calculator to the second input, and wherein the calculation circuit is further configured such that generating the third data in accordance with the second process includes,
- calculating, using the second calculator, the output of a first mathematical function using the difference as an input to the first mathematical function,
- selecting, using the first selector, the first input and providing the first input to the adder,
- selecting, using the second selector, an output of the second calculator and providing the output of the second calculator to the adder, and
- generating the third data by adding, using the adder, the first input to the output of the second calculator.

25. The apparatus of claim 24, wherein the determination circuit is further configured to compare the difference with a threshold value, and determine the process of generating the third data based on a result of the comparing.

26. The apparatus of claim 25, wherein,
- the calculation circuit is further configured to perform a multiplication of N bits and a multiplication of N/2 bits, and
- the determination circuit is further configured to,
  - control the data input to the multiplier circuit inputs to control the calculation circuit to select the first process in response to the difference exceeding the threshold value, and
  - control the data input to the multiplier inputs to control the calculation circuit to select the second process in response to the difference being less than or equal to the threshold value.

* * * * *